United States Patent [19]
Channell

[11] Patent Number: 5,210,374
[45] Date of Patent: May 11, 1993

[54] TERMINAL HOUSING FOR BURIED COMMUNICATION LINES

[76] Inventor: William H. Channell, 38181 Creek View Cir., Marrietta, Calif. 92362

[21] Appl. No.: 526,408

[22] Filed: May 21, 1990

[51] Int. Cl.$^5$ .............................................. H02G 9/00
[52] U.S. Cl. ...................................... 174/38; 174/60; 174/77 R
[58] Field of Search ...................... 174/38, 50, 51, 60, 174/77 R, 78; 361/386; 439/275, 521

[56] References Cited

U.S. PATENT DOCUMENTS

| | | | |
|---|---|---|---|
| Re. 27,746 | 8/1973 | Hamilton | 174/38 |
| 871,984 | 11/1907 | Cook | 174/60 |
| 3,435,124 | 3/1969 | Channell | 174/38 |
| 3,557,299 | 1/1971 | Dienes | 174/38 |
| 3,728,467 | 4/1973 | Klayum et al. | 174/38 |
| 3,769,443 | 10/1973 | Prezchala et al. | 174/38 |
| 3,848,074 | 11/1974 | Channell | 174/38 |
| 4,097,680 | 6/1978 | Summers | 174/38 |
| 4,243,834 | 1/1981 | Logioco | 174/38 |
| 4,542,437 | 9/1985 | Ellis et al. | 361/386 |

OTHER PUBLICATIONS

Bell System Practices, "Dedicated Plant-Buried-Control and Access Points", AT&T Co., May 3, 1967, U.S.A.

Primary Examiner—Leo P. Picard
Assistant Examiner—Hyung S. Sough
Attorney, Agent, or Firm—Christie, Parker & Hale

[57] ABSTRACT

An airtight, watertight, self-contained housing for buried communication lines, such as telephone lines comprising a main cable and service wires, includes a waterproof housing having a base, a ground stake for installing the housing in the ground, separate compartments formed in the housing below the base to separately receive main cable and service wires, a sealed inner splice chamber above the base, and a sealed outer terminal chamber above the base for enclosing the splice chamber and for containing a terminal block. Main cable passes through the base into the splice chamber which includes a support, an elastomeric seal forming a watertight seal between the main cable entering the splice chamber, and an opening to the chamber through the support. A waterproof inner cover joined to the support by a watertight seal forms the sealed splice chamber. The remaining area of the base has separate, removable screw-threaded plugs with O-ring seals to corresponding holes in the base, each for receiving a corresponding service wire. A service wire is installed by removing a sealed plug, passing the service wire through the hole for connection to the terminal block, and forming a watertight seal around the service wire with an elastomeric grommet. A waterproof outer cover is joined to the base by a watertight seal to form a sealed outer terminal chamber that encloses the terminal block and the sealed splice chamber. Another embodiment of the invention provides a terminal for service wire without use of the sealed inner splice chamber.

26 Claims, 12 Drawing Sheets

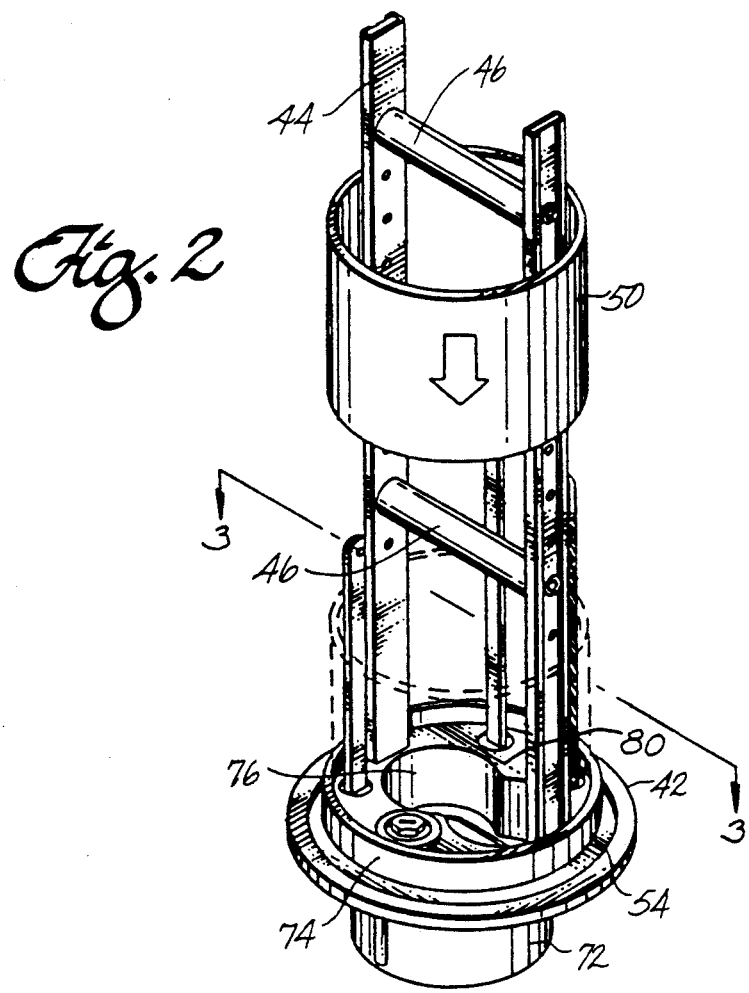
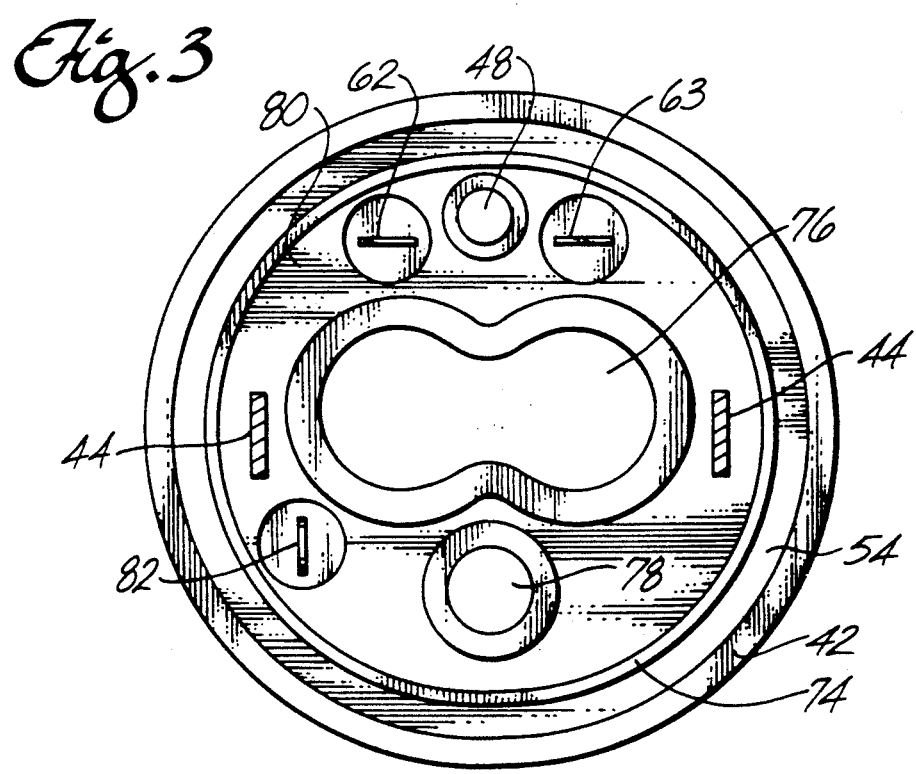

TERMINAL HOUSING FOR BURIED COMMUNICATION LINES

FIELD OF THE INVENTION

This invention relates generally to pedestal and underground terminals for buried communication lines, such as telephone and television cables. More particularly, the invention relates to an airtight, watertight, self-contained terminal housing that is especially useful for the efficient installation and trouble-free long term maintenance of underground telephone lines.

BACKGROUND OF THE INVENTION

Although the present invention can be adapted to providing a terminal for buried communication lines of various types, the invention will be described with relation to its use as a terminal for buried telephone lines.

In the installation of buried telephone lines, there is a need for a terminal that is completely reliable in withstanding adverse weather conditions. This includes protecting the buried telephone cable installation from water damage, including floods. Hot weather conditions prevalent in desert areas also can be a problem for buried telephone line terminals. Digital transmission, in particular, requires a dry environment inside the telephone terminal housing.

There is also a need for a terminal for buried cable which is not subject to aging or deterioration and which can be immune not only to weather conditions described above, but also to salt spray, acid or alkali soils, insects, fertilizers, insecticides, or other hostile environments.

One prior art terminal housing comprises a buried metal box. Loop cable passed to the inside of the box is taped to keep out moisture. This arrangement has proven unsatisfactory, especially because of its short useful life and the additional cost of phone installers to re-install the lines when problems arise in the field.

In addition to protecting telephone line installations from weather conditions and other hostile environmental conditions, an underground terminal also should reduce installation time and cost initially and as further service lines are later connected at the terminal site. Simplicity in the installation procedure is particularly useful for service wires inasmuch as each service wire installation may, over a period of time, be the responsibility of different service personnel.

The present invention provides a terminal for underground communication lines, such as telephone lines, in which the installation at the terminal is completely sealed from the environment. The invention is particularly characterized by being airtight and watertight to the extent that it meets the most stringent of industry imposed standards for long-term protection against water damage, heat, and other environmental hazards described above. The terminal also is easy to install, can be manufactured at a reasonable cost, and facilitates ease of later installation of service wire at the terminal site.

SUMMARY OF THE INVENTION

One embodiment of the invention comprises an airtight, watertight, self-contained housing for buried communication lines, such as telephone lines comprising a main cable and service wires. The terminal includes a waterproof housing having a base, means for installing the housing in the ground, separate compartments formed in the housing below the base to separately receive main cable and service wires, a sealed inner splice chamber above the base, and a sealed outer terminal chamber above the base for enclosing the splice chamber and for containing a terminal block. The main cable passes through the base and into the splice chamber which includes a support, an elastomeric seal forming a watertight seal between the main cable entering the splice chamber and an opening to the chamber through the support. A waterproof inner cover is joined to the support by a watertight seal to form the sealed splice chamber. The remaining area above the base has separate, removable, screw-threaded plugs with O-ring seals to corresponding holes in the base, each for receiving a corresponding service wire. A service wire is installed by removing the sealed plug, passing the service wire through the hole for connection to the service block, and forming a watertight seal in the hole around the service wire. A waterproof outer cover is joined to the base by a watertight seal to form a sealed outer terminal chamber that encloses the terminal block and service wire connections, while also enclosing the sealed splice chamber.

Another embodiment of the invention provides a similar terminal that is airtight and watertight in sealing service wires extending through the base to a terminal block contained in a sealed housing. This embodiment of the invention does not contain the sealed splice chamber, and is useful in buried (handhole) applications.

These and other aspects of the invention will be more fully understood by referring to the following detailed description and the accompanying drawings.

BRIEF DESCRIPTION OF THE DRAWINGS

FIG. 2 is a perspective view illustrating components of a splice chamber.

FIG. 3 is a top view taken on line 3—3 of FIG. 2.

DETAILED DESCRIPTION

As mentioned previously, the present invention is related to the connection of buried communication lines to a terminal installed in the ground. The terminal can be a pedestal-type terminal which extends above the ground so that access to underground cables and connections in the terminal can be readily made by the installer and later by service personnel. The invention can be considered an improvement over a previous pedestal-type terminal for buried communication lines disclosed in my U.S. Pat. No. 3,435,124 which is incorporated herein by this reference. Although the terminal of this invention can have application to the termination of communication lines generally, the invention will be described below with respect to a preferred embodiment comprising a pedestal terminal for use in the installation and connection of underground telephone lines. More specifically, the invention will be described first with respect to a pedestal terminal for connection to buried telephone lines which include a main cable and separate service wires. The main cable comprises a bundle of separate, insulated wires contained in outer shielding which, in turn, are contained within an outer insulating jacket, as is familiar to those skilled in the art. The service wires are separate shielded wires installed one at a time by service personnel who come to the terminal site to make installation of service wires when individual service connections are required.

Figure 1:
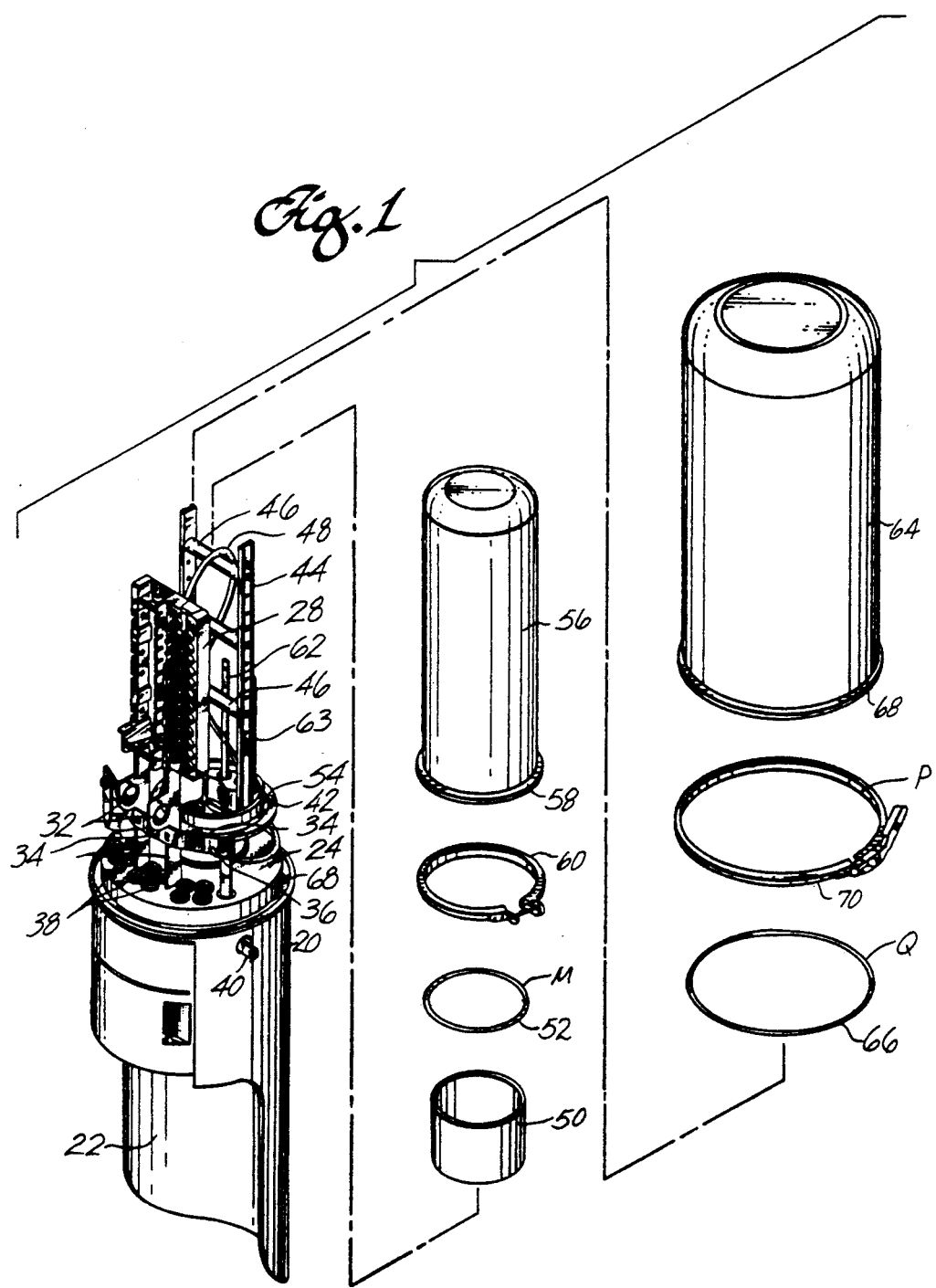
FIG. 1 is an exploded perspective view showing components of a buried communication line terminal according to principles of this invention.

Referring now to the drawings, FIG. 1 is an exploded view illustrating the principal system components of a pedestal terminal that provides connections for underground telephone lines which can include main cable and service wires. The pedestal terminal includes a waterproof housing of hard plastic which comprises a tubular outer shell 20 and a ground stake 22 extending below the shell to provide a means for installing the housing in the ground. A circular base 24 extends above the shell and separates the ground from connections made internally within the terminal assembly. The shell contains a first chamber exposed to the ground below the base for receiving main cable as described below, and a separate second chamber, also exposed to the ground below the base, for receiving service wire as described below. The second chamber is closed by a ground skirt door 26. A terminal block 28 extends above the base 24 and includes terminal pair connections for service wire extending through the base as described below. The terminal block is mounted to a pair of metal supports 30 projecting above the base and is hinged to these supports so that the bottom of the terminal block can pivot about an axis parallel to the base. The supports 30 for the terminal block include large openings providing a wire run 32. Service wire bond clamps 34 a c mounted in a spaced apart relation along a bonding 36 spaced above the base 24. Service wire entrance plugs 38 are sealed through the base 24 below the terminal block, and these will be described in more detail below.

The terminal housing also includes a solid copper ground bar 40 projecting to the exterior of the housing through the wall of the shell and to the interior of the terminal housing. A circular support base 42, made of hard plastic integral with the base, projects above the base 24. An upright cable bundle support 44 is mounted to the support base 42 of the splice chamber. The cable support includes vertically spaced apart, adjustable bundle supports or support rungs 46. A terminal stub 48 is secured to the bundle support 44. The terminal stub 48 is a continuation of the terminal block 28 and enters the splice chamber through a sealed opening in the bottom of the support base 40. The wires from the terminal stub are connected to wires in a main loop cable in the splice chamber as described below. The support base 42 has an interior surface area, described below, providing communication to main cable installed through the base 42 for connection within the splice chamber as described below. Wires within the main cable are bundled and mounted to the adjustable bundle supports. Once installation of the main cable is completed, a tubular plastic resin mold 50 is mounted over the base 42 of the splice housing. An elastomeric inner O-ring seal 52 is mounted to the support base 42 in a circular groove 54 that surrounds the resin mold. An inner cover 56 is then placed over the bundle support 44, and mounted atop the inner O-ring seal 52. A flanged ring 58 at the base of the inner cover 56 rests on the inner O-ring seal 52. An inner cover clamp 60 extends around the outer perimeter of the base 42 and around the flanged ring 58 of the inner cover 56; and the inner cover clamp 60, when actuated, is contracted circumferentially around the bottom of the cover and the support base 42 to apply pressure through the inner O-ring seal 52 to form a watertight seal at the base of the cover 56. This forms a sealed splice chamber above the base 24 of the housing and isolated from the terminal block 28. Bonding ribbons 62 and 63, projecting uprightly above the base 42, provide connections to cable shield bond clamps on the main cable as described below.

Once the sealed inner splice chamber has been formed, a tubular hard plastic waterproof outer cover 64 is installed over the splice chamber and the terminal block 28. An elastomeric outer O-ring seal 66 is mounted to a circular groove 68 surrounding the base 24. A flanged ring 65 of the outer cover rests on top of the outer O-ring seal 66. An outer cover clamp 70 then fits around the perimeter of the base, around the outer O-ring seal, and around the flanged lower portion of the outer cover. When the outer cover clamp 70 is actuated, it contracts circumferentially to apply pressure to the outer O-ring seal 66 to form a watertight seal at the base of the outer cover 64.

The following FIGS. 2 through 16 are more detailed views illustrating steps in the process of installing main cable and service wires in the terminal. FIGS. 2 and 3 illustrate components of the splice chamber in which the circular base 42 is held spaced above the base 24 of the housing by a lower short riser 72. A circular rim 74 extends around the base on a side opposite the riser 72. The O-ring seal 52 is disposed in a circular recess around the outside of the circular rim 74. The inner bundle support 44 with its adjustable support rungs 46 project above the base 42 inside the circular rim 74. The circular resin mold 50 can slide vertically along the bundle support and can rest on the inside portion of the base 42, inside the circular rim 74. Referring to FIG. 3, openings through the base 42 to the interior of the splice chamber include a main cable port 76 and a branch cable port 78. FIG. 3 also shows means for mounting the bonding ribbons 62 and 63 and the terminal stub 48, all of which are sealed by watertight seals through an elevated portion 80 of the base inside the splice chamber. A branch bonding ribbon is shown at 82 sealed in a watertight seal through the base 80.

Figure 4:
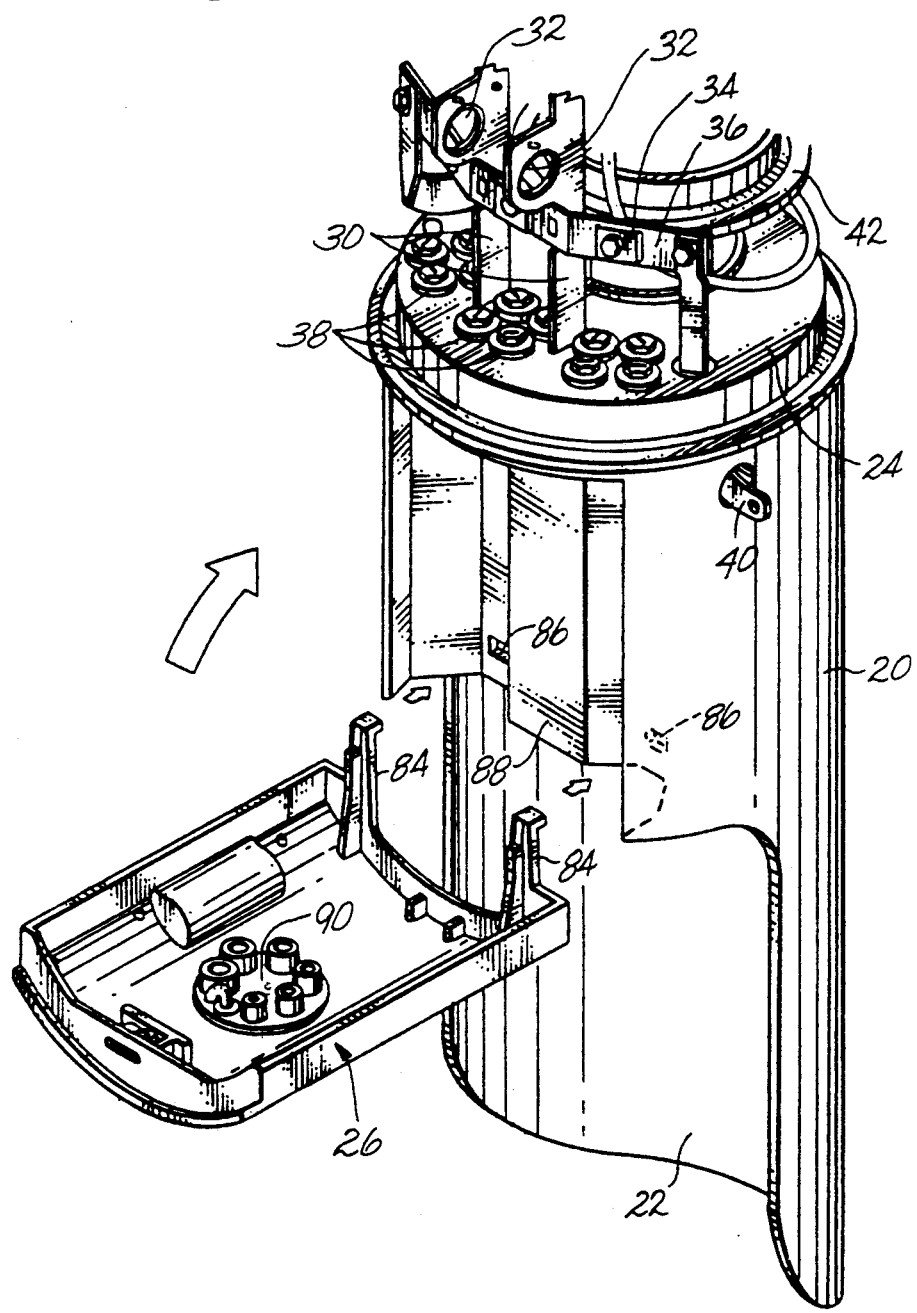
FIG. 4 is a fragmentary perspective view illustrating access to compartments under a base in the terminal housing.

FIG. 4 illustrates a lower portion of the housing below the base 24 which includes a removable ground skirt section for easy access to multiple service wire entrances, each being sealed by a corresponding one of the service wire entrance plugs 38. This lower portion of the terminal housing includes the removable ground skirt door 26 which rotates open through legs 84 releasably disposed in corresponding slotted openings 86 in a partition which isolates a compartment for main cable from a compartment for service wire, both of which compartments are below the base 24. These compartments are exposed to the ground, and the main cable and service wires are installed by extending them up through their corresponding compartments into the splice chamber and terminal block chamber, respectively.

The removable ground skirt door 26 includes a service wire gauge 90 for use in measuring the diameter of the service wire prior to installing the service wire in a manner described in more detail below.

Figure 5:
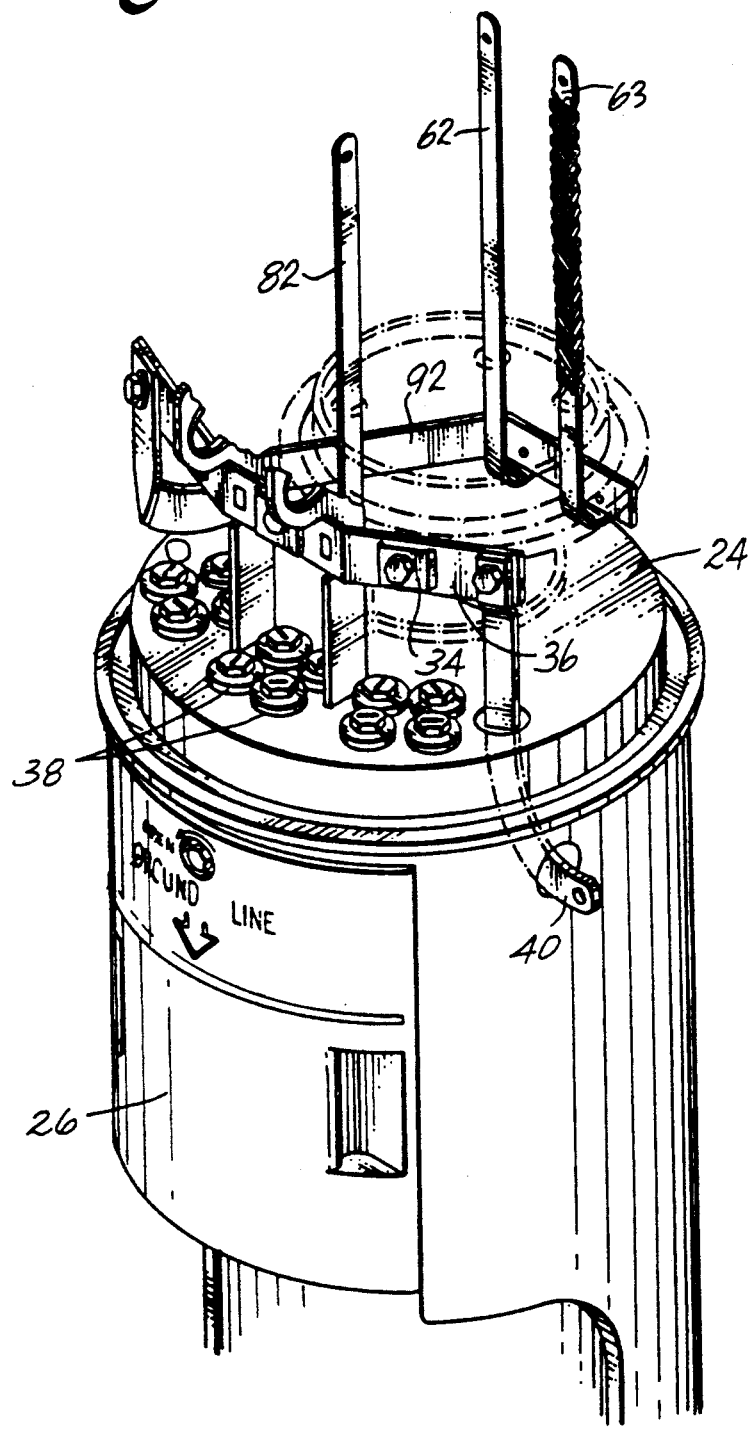
FIG. 5 is a perspective view illustrating a ground bar and service wire bond together with branch, field and office bond connections for the inside of a splice chamber.

FIG. 5 shows the removable ground skirt door in its closed position, and also illustrates connection of the ground bar 40 to the service wire bonding bar 36. This figure also illustrates bonding provided with a carbon steel external bonding bar 92 installed in the splice chamber. The bonding bar 92 is a continuation of the ground bar 40 through the bonding bar 36. Field, office and branch bonding ribbons also are shown in the splice chamber. The field bond ribbon 62 is shown to the left of the office bond ribbon 63, and the branch bond ribbon is shown at 82. The field, office and branch bonding ribbons are connected to the bonding bar 92 and installed into the splicing chamber.

Figure 6:
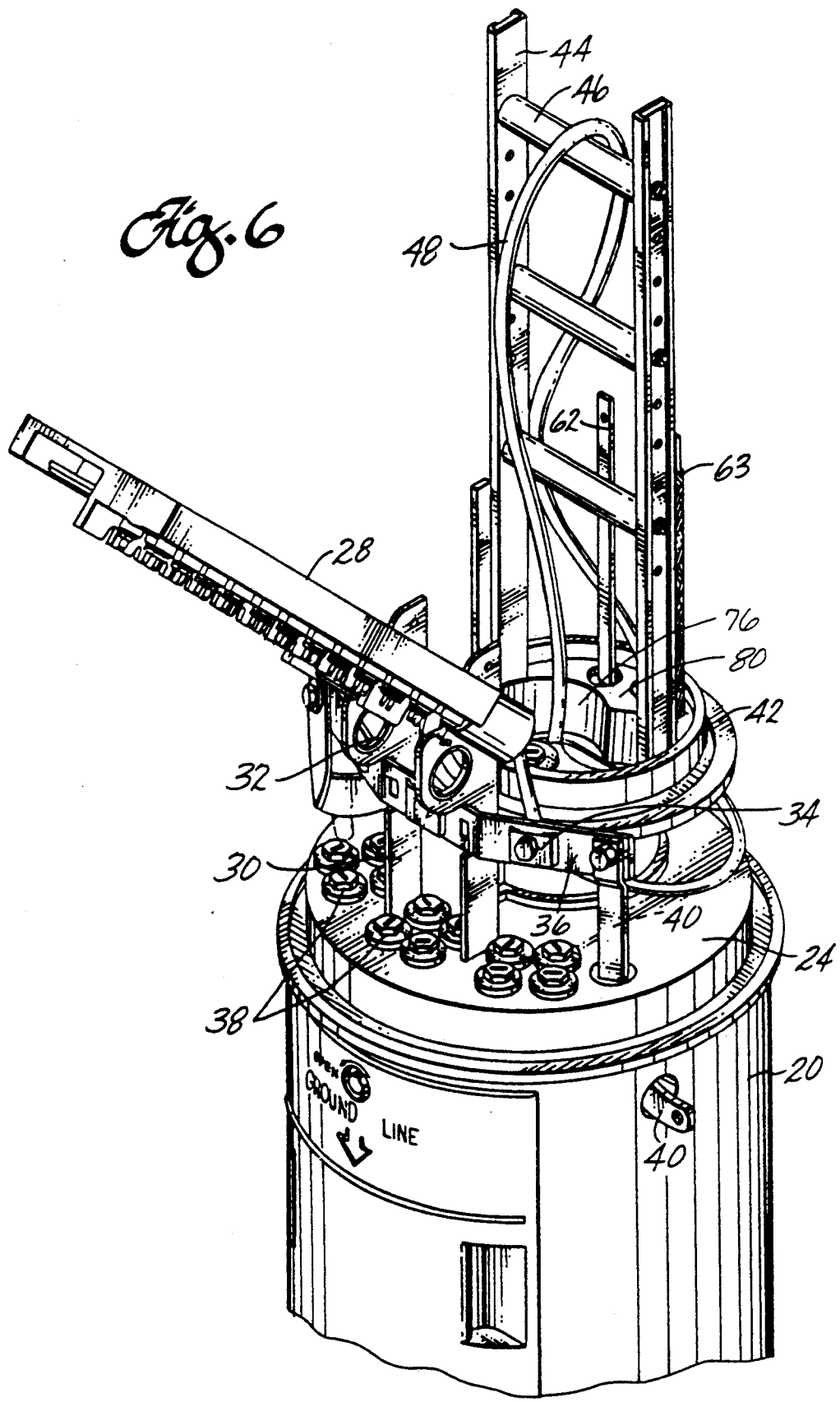
FIG. 6 is a fragmentary perspective view illustrating access to the splice chamber.
Figure 7:
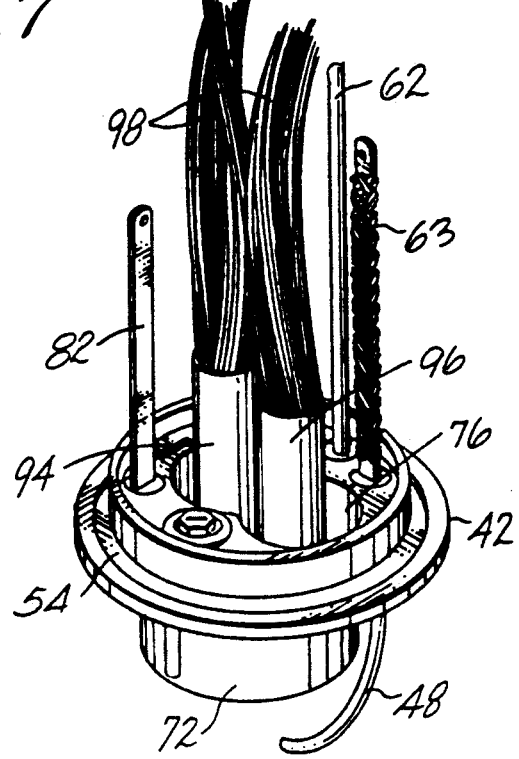
FIG. 7 is a perspective view illustrating installation of main cable in the splice chamber.

To install main cable in the terminal housing, a main cable loop or cable ends are exposed above the final grade of the ground at the terminal location. Cable preparation can follow standard procedures which can include scoring the outer sheath and shield above the final grade, removing the outer sheath and shield between scores, scoring the inner sheath about one inch above the outer sheath, removing the inner sheath between scores, and removing the core wrapper. Prior to installing the stake assembly 22 in the ground, the outer cover clamp 70 and outer cover clamp 64 are removed from the stake, together with the inner cover clamp 60 and the inner cover 56 being removed from the splicing chamber support. The bundle support 44 is then removed from the splicing chamber support, and the resin mold 50 also is removed from the splicing chamber support. If a branching cable is required, the branch cable entrance plug is removed from the base of the splicing chamber. The looped cable or cable ends are then fed up through the main cable port 76 in the support base of the splice chamber. FIG. 7 best illustrates installation of the main cable which shows the main cable in the form of left and right cable sections 94 and 96 with the insulated electrical conductors 98 of the spliced main cable sections extending upwardly above the base 42 and into the interior of the splice chamber. The terminal block can pivot down, away from the splice chamber, to provide good access for making splice connections in the splice chamber, as shown in FIG. 6.

The main cable sections 94 and 96 are sealed through the base of the splice chamber in a watertight seal. The main cable port 76 to the splice chamber is oversized relative to the outside diameter of the cable sections, and the annulus surrounding the cable is sealed off with a main cable grommet 100 shown best in FIG. 8. The grommet is preferably made from an elastomeric material such as a dense rubber and is in the form of a solid block shaped as a figure-eight to match the shape of the main cable port 76. The sides of the block also are tapered to form a wedge shape so that the oversized grommet can be wedged down into the main cable entrance to seal around the outside of the cable.

Figure 8:
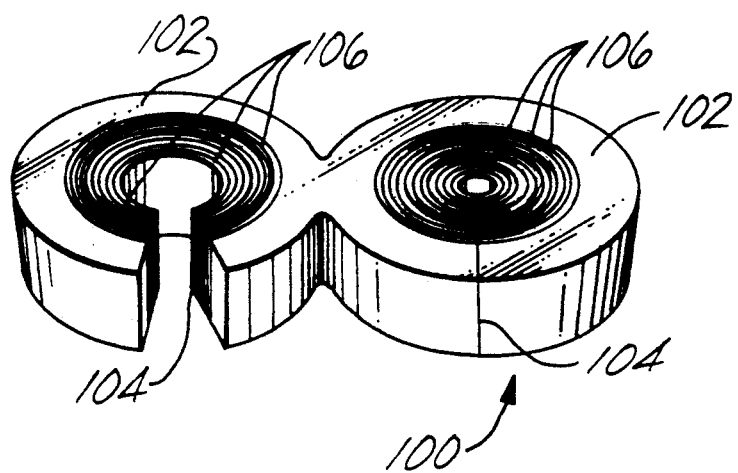
FIG. 8 is a perspective view illustrating a grommet for sealing main cable to the inside of the splice chamber.

The grommet has two rounded sections 102, each with a radial split 104. Each rounded section of the grommet also has multiple series of circular slits 106 concentric with the center of each section (and therefore-concentric with the inner axis of the radial split). The concentric circular slit extend through most but not all of the depth of the block. The grommet is therefore impenetrable to water unless a central portion of the grommet is removed to fit around a cable. As shown best on the left side of FIG. 8, each radial split makes it possible to pull back opposite portions of the grommet on each side of the split to reveal the central portion of each rounded section 102 of the grommet. A measured portion of the grommet within a selected one of the circular slits can be removed to form cable entrances of desired diameters. The grommet enables the terminal to be installed on a looped cable or a single cable and still maintain a moisture-tight seal. The separate series of slits in the grommet are set to fit all cable sizes, and, in one embodiment, these cable sizes range from 0.4 inch through 1.2 inch diameter cables. The cable diameter is first measured using a measuring gauge that is related to the diameters of the concentric circular slits in the grommet. By measuring the diameter of each cable, it is then possible to determine the amount of rubber to be removed from the slitted region of the grommet so the grommet, when closed around the cable, will fit snugly around the cable. A measured gauge number indicating the smallest slit is located at the center of each grommet cable entrance, and by counting each slit from that number stopping at the number indicated on the measuring gauge allows the installer to remove the correct unwanted portion of the grommet with a pair of snips, so that a correctly fitted sealing grommet has a cable entrance hole nearest the cable diameter, yet which completely closes around the cable without undue force. The grommet rounded section 102 on the left side of FIG. 8 shows a portion of the grommet removed to seal around a cable of known diameter.

Figure 9:
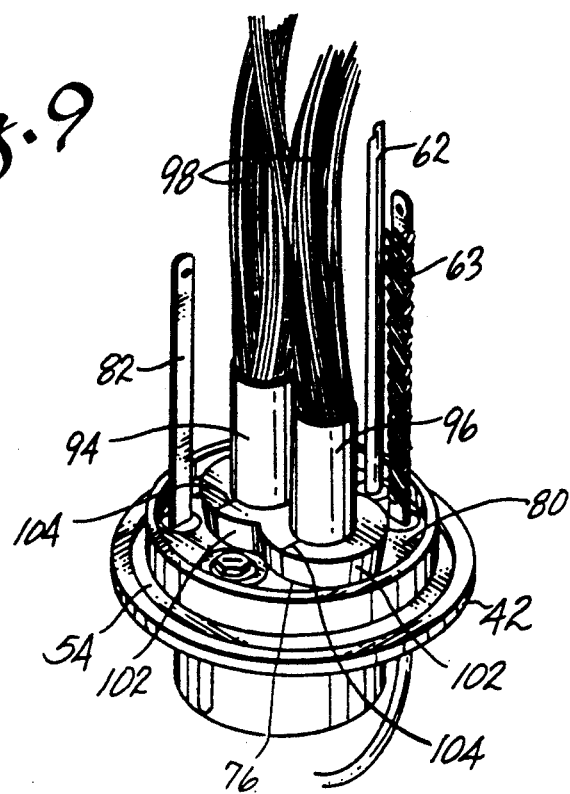
FIG. 9 is a fragmentary perspective view similar to FIG. 8, but showing the main cable in the process of being sealed to the bottom of the splice chamber.
Figure 10:
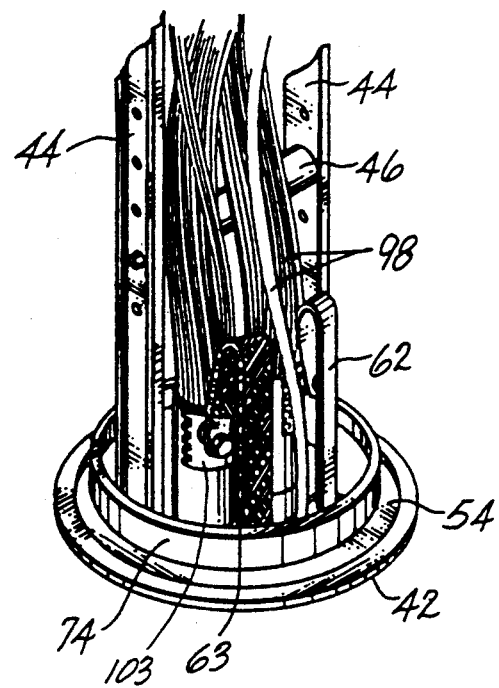
FIG. 10 is a fragmentary perspective view illustration ground connections for main cable in the splice chamber.
Figure 11:
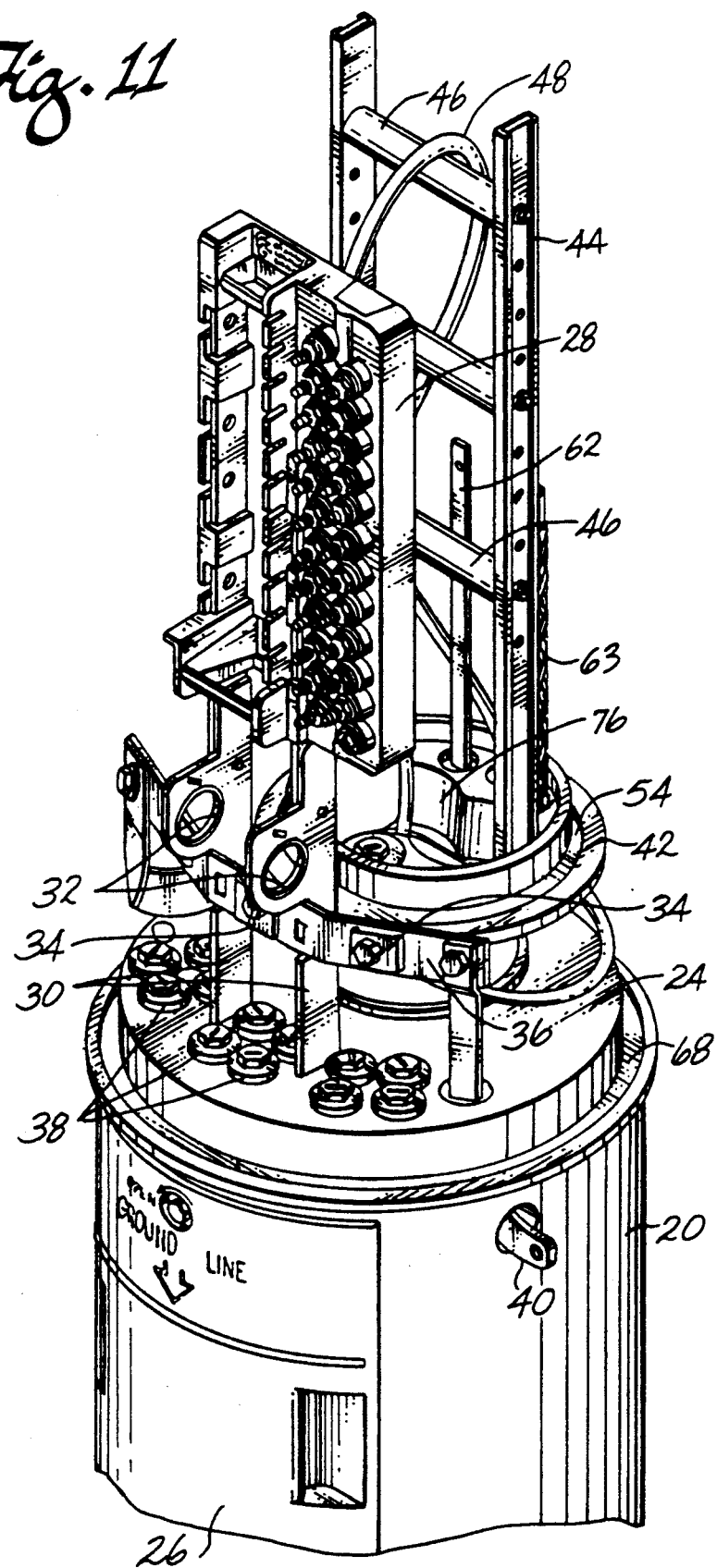
FIG. 11 is a fragmentary perspective view illustrating watertight plugs in a base inside the housing for use in passing service wires to a terminal block in a terminal housing.

As shown best in FIG. 9 once the sealing grommet is properly fitted around the main cable sections 94 and 96, the sealing grommet is then pushed into the main cable port until the sealing grommet is seated the surface 80 of the base 42. This can be done by applying downward pressure on the opposite rounded sections 102 of the sealing grommet to wedge it in the main cable port in the space around the cable sections 94 and 96. The bottom of the can be pushed downwardly in the main cable port to seat on an annular flanged shoulder (not shown) at the bottom of the main cable port. The cable shield is then bonded in the splice chamber by techniques known to those skilled in the art. This includes use of the bonding ribbons comprising the office, field and branch ribbons, which hook to cable shield bond clamps 103 in the splice chamber. Locations on the cables are selected for the cable shield bond clamps that will assure easy installation to the bonding ribbons. The bonding ribbons are formed and attached to correctly identify cables as shown in FIG. 10.

Following bonding procedures, the bundle support 44 is replaced the support surface 80 of the splice chamber and cables are spliced as required. The main cable bundle is then wrapped around a bundle support rung. The resin mold 50 is then replaced on the base of the splice chamber. The resin mold accommodates, in one embodiment, approximately 30 fluid ounces of resin (without cables). The resin is poured into the space inside the resin mold and above the seals and over the ends of the cable sheaths so that when the resin cures, it will form a permanent airtight and watertight dam above the top of the sheath. This seals off the conductors inside the cable sheath.

Following sealing of the splice chamber, the inner O-ring 52 is placed on the base 42, and the inner cover 56 is placed over the inner O-ring. The inner cover clamp 60 is then tightened to fasten the cover to the base forming a watertight seal.

Figure 12:
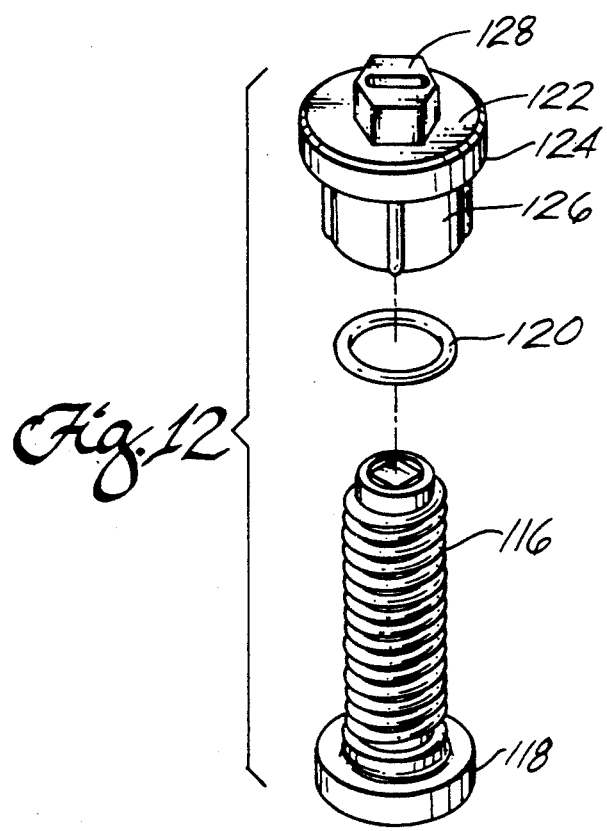
FIG. 12 is an exploded perspective view illustrating a watertight seal between each plug and a base of the housing.
Figure 13:
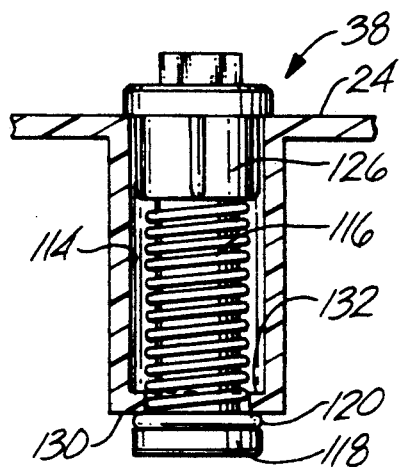
FIG. 13 is cross-sectional view illustrating a plug in its sealed position in the base.
Figure 14:
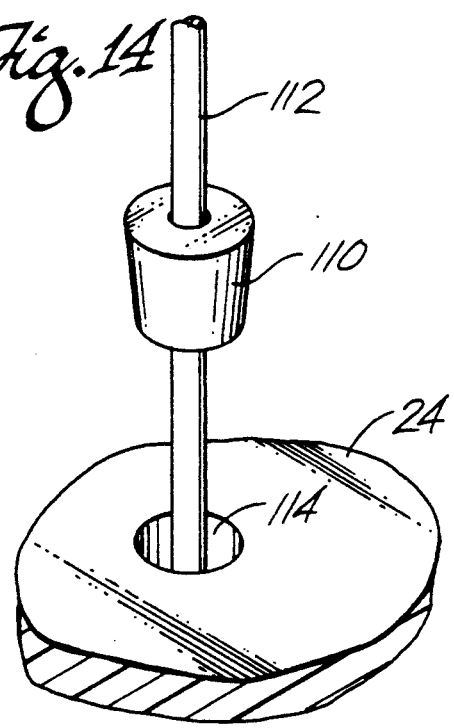
FIG. 14 is a perspective view illustrating a means of sealing a service wire in a hole through the base after the plug has been removed.

FIGS. 11 through 15 illustrate installation of service wire within the terminal block chamber of the housing. As shown best in FIG. 11, a number of the service wire entrance plugs 38 are located on the main base 24 of the housing below the terminal block 28 and exterior to the sealed splice chamber. To install a service wire, one of the service wire entrance plugs normally positioned in the base is removed, and the ground skirt door 26 is opened to reveal the compartment within the housing below the base where service wire can be installed. Opening of the ground skirt door also reveals the service wire gauge which can be used to measure the outside diameter of the service wire being installed. The wire gauge has six tapered openings to measure service wire diameter. The service wire is inserted into the larger end of the tapered holes in the gauge, and the largest hole that the service wire will not easily pass through determines the correct size of the sealing grommet. Each tapered hole has a number that corresponds a number on an elastomeric sealing grommet and the correctly sized grommet, shown at 110 in FIG. 14, is then fitted around a corresponding service wire 112. The grommet is preferably made from the same material as the grommet 100 and also is tapered so that it can be wedged into the annular space between the service wire 112 and the inside of a service wire entrance port 114 extending through the base 24 of the housing.

FIGS. 12 and 13 best illustrate detailed construction of the service wire entrance plug 38 which is used to normally seal off a service wire entrance port 114 through the base 24. The fastener assembly components are preferably made of hard plastic and include a plastic bolt having an externally threaded shaft 116 and a bolt head 118 with an annular upper surface that seats a resilient compressible O-ring 120. A cap nut 122 has a flanged portion with an annular lower rim 124 that rests against the top surface of the base 24. A tubular internally threaded shank 126 of the cap nut extends downwardly into the service wire entrance port 114. A hex section 128 at the top of the cap nut can be used with a hex wrench (not shown) for tightening the cap nut against the top of the base 24. Screw threaded engagement of the threads of the threaded bolt 116 with the cap nut draws the O-ring 120 into pressure contact with an annular rim 130 at the base of the service wire port 114.

Figure 15:
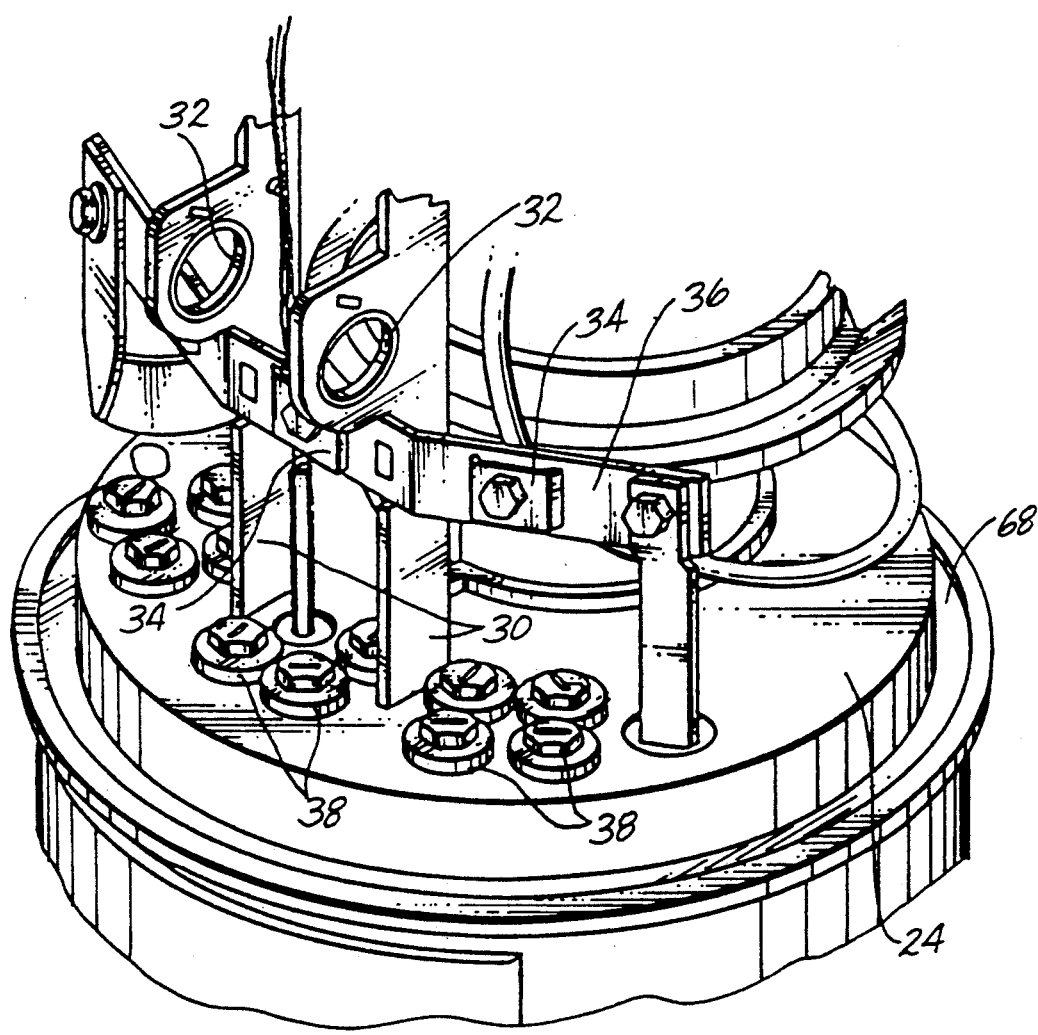
FIG. 15 is a fragmentary perspective view illustrating connection of a service wire to a service wire bond clamp in a sealed terminal chamber.

Thus, each service wire entrance plug assembly 38, when in its normal installed position as illustrated in FIG. 13, provides an airtight and watertight sealed base as a partition between the terminal block chamber and the portion of the terminal housing below the base 24. When installing the service wire 112 as shown in FIG. 14, the service wire entrance plug assembly 38 is first removed from the service wire entrance port 114, and the service wire is inserted up through the service wire port entrance 114. The sealing grommet is placed around the service wire to slide down within about two inches of its final sealing location. The outside of the sealing surface of the sealing grommet and inside of the service wire entrance port are lubricated with a suitable lubricant, and the grommet is then pressed into the hole around the service wire. The sealing grommet then is pushed down farther into the hole approximately to a level slightly below the surface of the terminal base 24. The bottom of the grommet can seat on an annular shoulder 132 (see FIG. 13) at the base of the service wire entrance port through which the service wire is installed. Once the service wire is sealed through the service wire entrance port, the service wire sheath is removed and the shield of the service wire is secured to the bonding bar 36 with corresponding service wire bond clamps 34 as shown in FIG. 15. The service wires are then passed through the wire runs 32 and attached to the terminal block for termination as required. Other service wires passing to the terminal block chamber, but not connected to the terminal block, can be stored in the wire run provided as an integral part of the terminal block 28.

Once the service wire terminations are completed, the outer O-ring 66 is seated in the circular groove 68 around the base 24, and the outer cover 64 is then placed over the outer O-ring 66 and the outer clamp 70 is tightened to apply pressure through the outer O-ring 66 to form an airtight and watertight seal at the base of the outer cover 64.

Thus, the invention provides a sealed inner splice chamber and a separate sealed outer chamber that is easily accessible for service wire connections to the terminal block. The outer chamber also provides a second additional seal for the permanently installed and sealed splice chamber. This maintains lower temperature levels in the more critical splice chamber than in the outer chamber which is useful in hot environments. The work of splicers and installers is separated, and any installations of service wire at a later date simply require removing the outer cover, sealing off a service wire passing into the terminal block chamber, connecting the service wire and replacing the outer cover. All connections of the service wires and main cable are inside completely sealed airtight and watertight chambers that can maintain the connections long term without being adversely affected by weather or environmental hazards.

Figure 16:
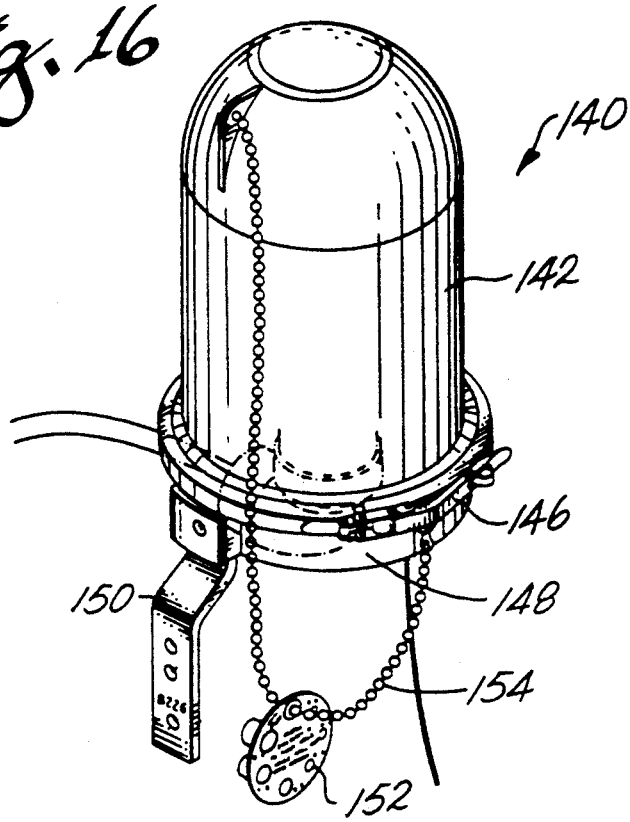
FIG. 16 is a perspective view illustrating an alternative form of the invention which comprises a terminal for buried (handhole) applications.

FIGS. 16 through 19 illustrate an alternative form of the invention which comprises a bracket mounted sealed terminal 140 for buried (handhole) telephone cable installations. FIG. 16 illustrates the terminal in its closed position, which includes a hard plastic waterproof hollow cover 142 sealed to a circular base 144. The seal includes an O-ring mounted circular groove 145 surrounding the base 144 and a cover clamp 146 for tightening around the bottom of the cover 142 and the base to compress against the seal. This forms an airtight and watertight seal at the base of the closed cover. A circular metal ring 148 is affixed to and extends downwardly from the bottom of the base 144, and a metal terminal mounting bracket 150 is rigidly affixed to the metal ring 148. The terminal also includes a service wire gauge 152 held captive to the outer cover by a fixed line 154.

Figure 17:
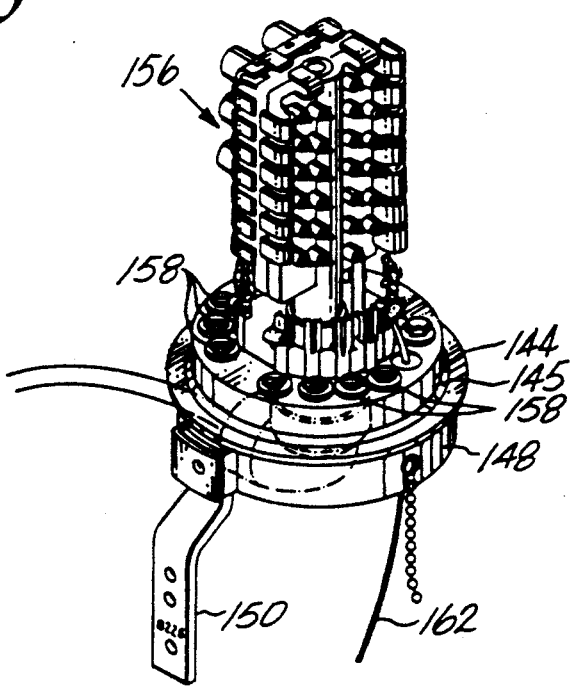
FIG. 17 is a perspective view illustrating the interior of a terminal block chamber of the terminal shown in FIG. 16.

FIG. 17 shows a terminal with its cover removed to expose the inside which includes a terminal block 156 with integral wire run and standard terminal connections mounted in an upright position above the base. The terminal connections on the terminal block 156 are adapted for connection to service wire extending from the area exposed to the ground below the base up through sealed openings in the base and to the terminal block. In a manner similar to the embodiment of FIGS. 1 through 15, a series of circumferentially spaced apart service wire entrance plugs 158 seal off the service wire entrance ports 160 which extend through the base 144. These plugs use separate O-ring seals similar to those illustrated in FIGS. 12 and 13 to form an airtight and watertight seal through the base when no service wire is present in each service wire entrance port 160.

Figure 18:
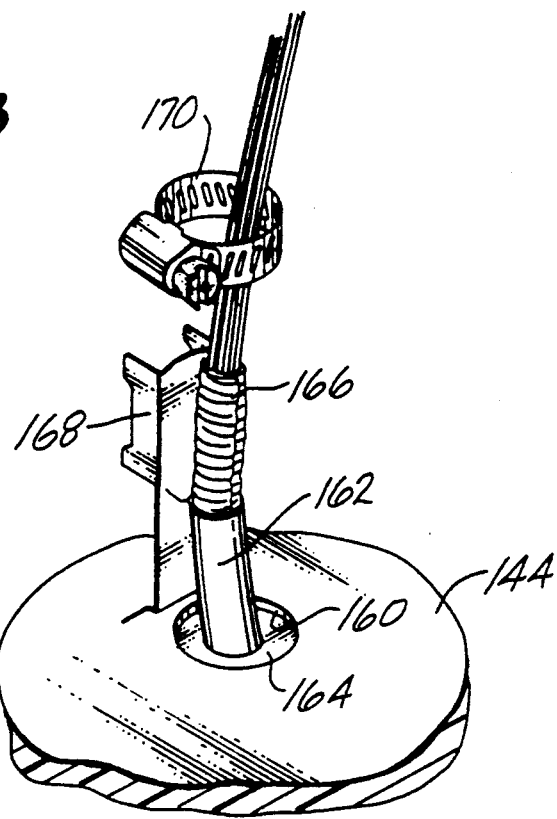
FIG. 18 is a fragmentary perspective view illustrating connection of a shielded service wire inside the terminal chamber.

Service wire is installed in a manner described previously and includes removing a service wire entrance plug to expose the service wire entrance port 160, pulling the service wire 162 upwardly through the service wire entrance port service wire 160, using the gauge 152 to determine the proper size of the sealing grommet, affixing the sealing grommet around the service wire 162 and press-fitting the grommet in the service wire entrance port 160 around the service wire to seal off the space between the service wire and the service wire entrance port. The bottom of the service wire entrance port includes an annular shoulder against which the seal is seated. FIG. 18 shows the top of a grommet 164 sealing off the service wire entrance port around the service wire 162. Following seating of the sealing grommet around the service wire, the wire is prepared by exposing a shielded section 166 which is attached to a bonding crown 168. The wires are then extended upwardly through a clamp 170 and to the terminal block 156 for connection.

Figure 19:
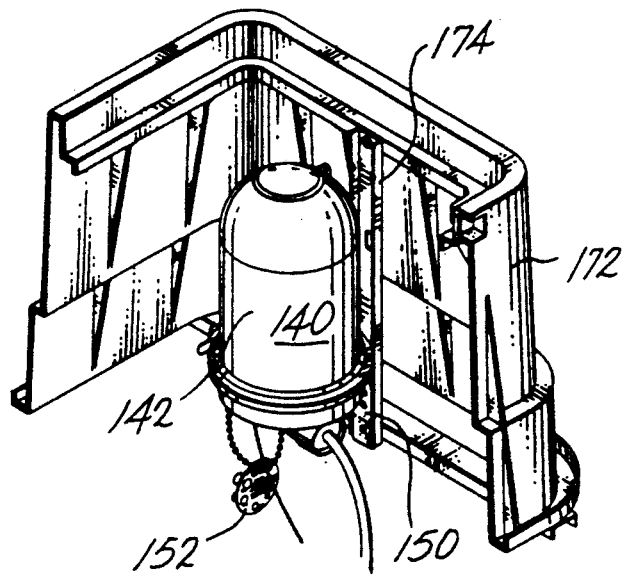
FIG. 19 is a fragmentary perspective view illustrating installation of the terminal of FIG. 16 in the interior of a ground-level utility housing.
Figure 1:
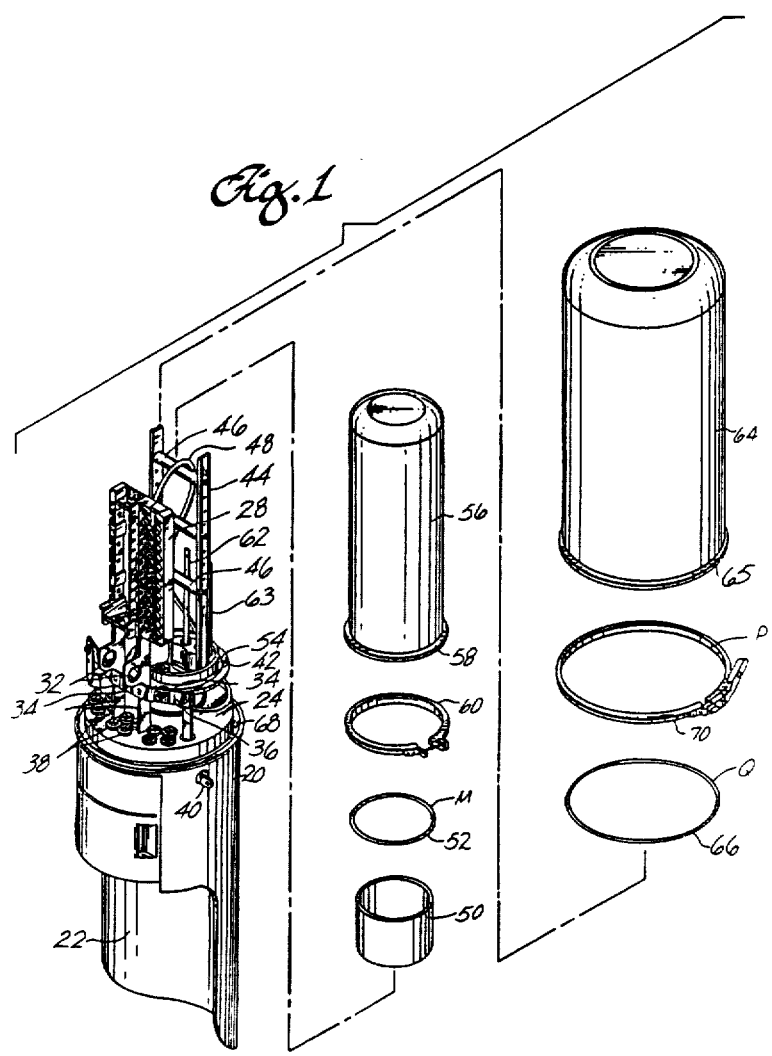

FIG. 19 illustrates installation of the bracket mounted terminal 140 in an underground utility housing 172, which includes a wall bracket 174 affixed inside the housing in an upright position. The terminal bracket bracket 150 can be secured to an upper portion of the wall bracket 174 in a temporary upper position until installation is completed after which the terminal bracket can be moved to a lower position shown in FIG. 19 and rigidly affixed in that position inside the utility housing.

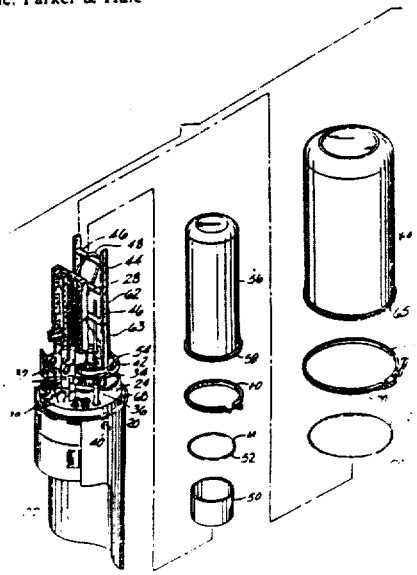

What is claimed is:

1. A terminal assembly for buried communication lines, such as telephone lines and the like, of the type which include shielded main cable and service wire, the terminal assembly comprising:

a waterproof housing having a base, means below the base for installing the housing in the ground, including separate compartment means below the base for receiving the main cable and the service wire, and an inner support surface above the base and open to the compartment means, leaving a remaining surface area above the base and open to the compartment means;

an opening in the inner support surface to receive the main cable passed from the compartment means through the inner support surface;

means forming a watertight and airtight seal between the main cable and the opening in the inner support surface;

a waterproof inner cover having a hollow interior facing toward the inner support surface, to form an inner splice chamber around the main cable sealed above the inner support surface, the main cable being adapted for making splice connections within the inner splice chamber;

means forming a watertight and airtight seal between the inner cover and the inner support surface to thereby form a sealed watertight and airtight inner splice chamber for the main cable and its splice connections above the inner support surface and within the hollow interior of the inner cover;

a plurality of separate and independent plug means disposed in corresponding holes extending through the base to communicate between the compartment and the remaining surface area above the base adjacent the inner splice chamber;

means forming a watertight and airtight seal between each said plug means and its corresponding hole to seal the remaining surface area above the base from the compartment means, the sealed plug means each being separately removable form the hole through the base so that the service wire can be extended from the compartment means through a corresponding hole in a base and to the remaining surface area above the base;

means for forming a watertight and airtight seal between each service wire and its corresponding hole in the base;

terminal block means above the remaining surface area above the base for connection to the service wire;

a waterproof outer cover having a hollow interior facing toward the base to form a terminal chamber that encloses the sealed inner splice chamber and the terminal block means and service wire connected thereto;

means forming a watertight and airtight seal between the outer cover and the base to seal off the interior of the terminal chamber separate from the sealed inner splice chamber and thereby form a watertight and airtight terminal chamber above the remaining surface area above the base; and means for removing the sealed outer cover from the base to expose the terminal block for further connection to service wire passing through the corresponding removable plug means sealed in the base, so that said further connection can be made without exposing the interior of the sealed inner splice chamber.

2. Apparatus according to claim 1 in which the terminal block pivots away from the sealed inner splice chamber.

3. Apparatus according to claim 1 including means for removing the inner cover from its sealed position on the inner support.

4. Apparatus according to claim 1 in which the means for sealing he service wire in the holes through the base comprise separate elastomeric grommets that each fit through the corresponding hole and around the service wire and against an annular shoulder disposed inside the hole.

5. Apparatus according to claim 4 in which each grommet has means for forming a hole through it of a diameter slightly less than the diameter of the service wire.

6. Apparatus according to claim 1 in which the means for sealing the main cable in the opening in the inner support surface comprises an elastomeric grommet than fits in the opening and around the main cable and against an annular shoulder disposed inside the opening.

7. Apparatus according to claim 6 in which the grommet has means for forming a hole through it of a diameter slightly less than the diameter of the main cable.

8. Apparatus according to claim 6 in which the grommet is adapted to seal around at least one main cable section independently.

9. Apparatus according to claim 1 including first and second clamps, which are contracted in size without the use of external fastening means, and which extend around the inner support surface and around the base, each to apply pressure to the corresponding sealing means for sealing the inner cover to the inner support surface and the outer cover to the base.

10. Apparatus according to claim 9 including separate O-ring seals between the inner cover and the inner support surface and between the outer cover and the base, each of which O-ring seals has pressure applied to it by the corresponding first and second clamps.

11. Apparatus according to claim 1 including at least one bond ribbon inside the inner splice chamber sealed through the inner support surface and extending to the remaining area above the base inside the terminal chamber, and an electrical bond bar in the terminal chamber having at least one connection to the bond ribbon so the bond ribbons can be disconnected from the bond bar for testing without opening the sealed inner splice chamber.

12. Apparatus according to claim 11 in which the terminal assembly comprises a telephone line terminal housing; in which the bond ribbons comprise field, office and branch bond ribbons, and in which the bond ribbons in the splice chamber are connected to a cable shield on the main cable.

13. Apparatus according to claim 12 in which the bond ribbons are each sealed by a watertight and airtight seal to the inner support of the inner splice chamber.

14. Apparatus according to claim 1 including means for maintaining resilient pressure contact to form the separate watertight and airtight seals between:
(a) the main cable and the opening in the inner support surface,
(b) the inner cover and the inner support surface,
(c) said plug means and its corresponding hole in the base,
(d) said service wire and its corresponding hole in the base, and
(e) the outer cover and the base.

15. An airtight, watertight, self-contained terminal assembly for buried communication lines and the like of the type which at least includes a plurality of separate service wires, the terminal assembly comprising:
a waterproof housing having a base, means below the base for installing the housing in a fixed position adjacent the service wire, and a compartment below the base for receiving a service wire;
a terminal block above the base having means for connection to the service wire;
a plurality of separate and independent plug means disposed in corresponding holes extending through the base adjacent the terminal block to communicate between the service wire in the compartment and the terminal block above the base;
means forming a watertight and airtight seal between each said plug means and its corresponding hole to seal the area above the base from the compartment below the base, the plug means each being separately removable from the holes through the base so that each service wire can be extended from the compartment through a separate hole in the base to the terminal block above the base for connection to the terminal block, and in which the plug means comprise a screw-threaded fastener sealed by an O-ring to one side of the base and extending through the hole in the base, and means on an opposite side of the base for tightening the fastener in the hole to apply sealing pressure to the O-ring;
means forming a watertight and airtight seal between each service wire and its corresponding hole;
a waterproof cover having a hollow interior facing toward the area above the base to form a terminal chamber for enclosing the terminal block;
means forming a watertight and airtight seal between the cover and the base to seal off the interior of the terminal chamber; and
means for removing the sealed cover from the base to expose the plug means for connection of further service wire to the terminal block.

16. Apparatus according to claim 15 in which the means for sealing the service wire and the holes through the base comprise separate elastomeric grommets that each fit down through the corresponding hole in the base and around the service wire and against an annular shoulder molded inside the hole.

17. Apparatus according to claim 16 in which each said grommet has means for forming a hole through it of a diameter slightly less than the diameter of the service wire.

18. Apparatus according to claim 15 including a clamp which is contracted in size without the use of external fastening means, and which extends around the base to apply pressure to the sealing means for sealing the cover to the base.

19. Apparatus according to claim 18 including an O-ring seal between the cover and the base, the seal having pressure applied to it by the clamp.

20. A terminal assembly for buried communication lines of the type including shielded main cable and service cable, the terminal assembly comprising;
a waterproof housing having a base, means below the base for installing the housing in the ground, including a separate compartment means below the base for receiving the main cable and the service, and an inner support surface above the base and open to the compartment means, leaving a remaining surface area above the base and open to the compartment;

an opening in the inner support surface to receive the main cable passed from the compartment means through the inner support surface;

means forming a watertight and airtight seal between the main cable and the opening in the inner support surface;

a waterproof inner cover having a hollow interior facing toward the inner support surface, to form an inner splice chamber around the main cable sealed above the inner support surface, the main cable being adapted for making splice connections within the inner splice chamber;

means forming a watertight and airtight seal between the inner cover and the inner support surface to thereby form a sealed watertight and airtight inner splice chamber for the main cable and its splice connections above the support surface and within the hollow interior of the inner cover;

a plurality of separate and independent service wire passageways extending through the base for receiving separate service wires communicating between the compartment means and the remaining surface area above the base adjacent the inner splice chamber;

means forming a watertight and airtight seal between each service wire and its respective passageway;

terminal block means above the remaining surface area above the base for connection to the service wires;

a waterproof outer cover having a hollow interior facing toward the base to form a terminal chamber that encloses the sealed inner splice chamber and the terminal block means and service wire connected thereto;

means forming a watertight and airtight seal between the outer cover and the base to seal off the interior of the terminal chamber separate from the sealed inner splice chamber and thereby form a watertight and airtight terminal chamber above the remaining surface area above the base; and means for removing the sealed outer cover from the base to expose the terminal block and the connections to the service wire passing from the compartment through the base and to the terminal chamber, without exposing the interior of the sealed splice chamber.

21. Apparatus according to claim 20 including at least one bond ribbon inside the inner splice chamber sealed through the inner support and extending to the remaining area above the base inside the terminal chamber, and an electrical bond bar in the terminal chamber having at least one combination to the bond ribbon so the bond ribbon can be disconnected from the bond bar for testing without opening the sealed inner splice chamber.

22. Apparatus according to claim 21 in which the terminal assembly comprises a telephone terminal for buried telephone lines, in which the bond ribbons comprise field, office and branch bond ribbons, and in which the bond ribbons in the splice chamber are connected to a cable shield on the main cable.

23. Apparatus according to claim 22 in which the bond ribbons each sealed by a watertight and airtight seal to the inner support of the splice chamber.

24. Apparatus according to claim 20 including means for maintaining resilient pressure contact to form the separate watertight and airtight seals between:
   (a) the main cable and the opening in the inner support surface,
   (b) the inner cover and the inner support surface,
   (c) each said service wire and its respective passageway, and
   (d) the outer cover and the base.

25. A terminal assembly for buried communication lines, such as telephone lines and the like, of the type which include shielded main cable and service wire, the terminal assembly comprising:

a waterproof housing having a base, means below the base for installing the housing in the ground, including separate compartment means below the base for receiving the main cable and the service wire, and an inner support above the base and open to the compartment means, leaving a remaining area above the base open to the compartment means;

an opening in the inner support to receive the main cable passed from the compartment means through the inner support;

means forming a watertight and airtight seal between the main cable and the opening in the inner support;

a waterproof inner cover having a hollow interior facing toward the inner support, to form an inner splice chamber around the main cable sealed above the inner support;

means forming a watertight and airtight seal between the inner cover and the inner support to thereby form a sealed watertight and airtight inner splice chamber for the main cable above the base and within the hollow interior of the inner cover;

a plurality of separate and independent plug means disposed in corresponding holes extending through the base to communicate between the compartment means and the remaining area above the base adjacent the splice chamber;

means forming a watertight and airtight seal between each said plug means and its corresponding hole to seal the remaining area above the base from the compartment means, the plug means each being separately removable from the hole through the base so that a separate service wire can be extended from the compartment means through a corresponding hole in the base and to the remaining area above the base, in which the plug means comprise a screw-threaded fastener sealed by an O-ring to one side of the base and extending through the hole in the base, and means on the opposite side of the base for tightening the fastener in the hole to apply sealing pressure to the O-ring;

means for forming a watertight and airtight seal between each said service wire and its corresponding hole;

terminal block means above the remaining area above the base for connection to the service wire;

a waterproof outer cover having a hollow interior facing toward the base to form a terminal chamber that encloses the sealed inner splice chamber and the terminal block;

means forming a watertight and airtight seal between the outer cover and the base to seal off the interior of the terminal chamber separate from the sealed inner splice chamber; and means for removing the sealed outer cover from the base to expose the terminal block for further connection to the service wire passing through the corresponding removable plug means sealed in the base, so that said further connection can be made without exposing the interior of the sealed splice chamber.

26. A terminal assembly for buried communication lines, such as telephone lines and the like, of the type which include shielded main cable and service wire, the terminal assembly comprising:

- a waterproof housing having a base, means below the base for installing the housing in the ground, including separate compartment means below the base for receiving the main cable and the service wire, and an inner support above the base and open to the compartment means, leaving a remaining area above the base open to the compartment means;
- an opening in the inner support to receive the main cable passed from the compartment means through the inner support;
- means forming a watertight and airtight seal between the main cable and the opening in the inner support;
- a waterproof inner cover having a hollow interior facing toward the inner support, to form an inner splice chamber around the main cable sealed above the inner support;
- means forming a watertight and airtight seal between the inner cover and the inner support to thereby form a sealed watertight and airtight inner splice chamber for the main cable above the base and within the hollow interior of the inner cover;
- a plurality of separate and independent plug means disposed in corresponding holes extending through the base to communicate between the compartment means and the remaining area above the base adjacent the splice chamber;
- means forming a watertight and airtight seal between each said plug means and its corresponding hole to seal the remaining area above the base from the compartment means, the plug means each being separately removable from the hole through the base so that a separate service wire can be extended from the compartment means through the corresponding hole in the base and to the remaining area above the base, the plug means comprising a screw-threaded fastener sealed by an O-ring to one side of the base and extending through the hole in the base, and means on the opposite side of the base for tightening the fastener in the hole to apply sealing pressure to the O-ring;
- means for forming a watertight and airtight seal between each said service wire and its corresponding hole;
- terminal block means above the remaining area above the base for connection to the service wire;
- a waterproof outer cover having a hollow interior facing toward the base to form a terminal chamber that encloses the sealed inner splice chamber and the terminal block;
- means forming a watertight and airtight seal between the outer cover and the base to seal off the interior of the terminal chamber separate form the sealed inner splice chamber;
- means for removing the sealed outer cover from the base to expose the terminal block for further connection to the service wire passing through the corresponding removable plug means sealed in the base, so that said further connection can be made without exposing the interior of the sealed splice chamber; and
- at least one bond ribbon inside the inner splice chamber sealed through the inner support and extending to the remaining area above the base inside the terminal chamber, and an electrical bond bar in the terminal chamber having at least one connection to said at least one bond ribbon so that bond ribbon can be disconnected from the bond bar for testing without opening the sealed inner splice chamber.

* * * * *

UNITED STATES PATENT AND TRADEMARK OFFICE
CERTIFICATE OF CORRECTION

PATENT NO. : 5,210,374
DATED : May 11, 1993
INVENTOR(S) : William H. Channell

It is certified that error appears in the above-indentified patent and that said Letters Patent is hereby corrected as shown below:

The title page should be deleted to appear as per attached title page.

On the TITLE Page:

[56] References Cited, U.S. PATENT DOCUMENTS, change "Prezchala" to -- Pierzchala --.
[56] References Cited, U.S. PATENT DOCUMENTS, change "4,097,680" to -- 4,097,683 --.

In the Drawings:

The sheet of drawing consisting of FIG. 1 should be deleted and the attached sheet of FIG. 1 added.

Column 2, line 55, before "main" insert -- the --.
Column 2, line 62, change "illustration" to -- illustrating --.
Column 2, line 63, before "main" insert -- the --.

Column 3, line 4, before "cross-sectional" insert -- a --.

Column 4, lines 9,10, change "a c" to -- are captively --.
Column 4, line 10, after "bonding" insert -- bar --.
Column 4, line 26, after "base" change "40" to -- 42 --.

Column 5, line 7, after "base" insert -- 42 --.
Column 5, line 31, after "partition" insert -- 88 --.
Column 5, line 66, after "cover" and before "64" delete "clamp".

Column 6, line 51, change "1.2 inch" to -- 1.2 inches --.

UNITED STATES PATENT AND TRADEMARK OFFICE
CERTIFICATE OF CORRECTION

PATENT NO. : 5,210,374
DATED : May 11, 1993
INVENTOR(S) : William H. Channell

It is certified that error appears in the above-identified patent and that said Letters Patent is hereby corrected as shown below:

```
Column 7, line 6, after "seated" insert -- below --.
Column 7, line 11, after "the" and before "can" insert
          -- grommet --.
Column 7, line 24, after "replaced" insert -- on --.
Column 7, line 60, before "a number" insert -- with --.

Column 9, line 15, after "mounted" insert -- to a --.
Column 9, line 24, before "cover" delete "outer".
Column 9, line 36, after "entrance" delete the semicolon.
Column 9, line 46, after "entrance port" delete "service
          wire", and after "using the" insert -- service
          wire --.
Column 9, line 55, after "port" insert -- 160 --.
Column 9, line 66, before "150" delete "bracket".

Column 10, line 43, before "plug" delete "sealed".
Column 10, line 44, change "form" to -- from --.
Column 10, line 46, after "through" change "a" to -- the --.
Column 10, line 47, after "hole in" change "a" to -- the --.

Column 11, line 12, after "sealing" change
          "he" to -- the --.
Column 11, line 23, after "grommet" change "than" to
          -- that --.
Column 11, line 51, after "bond" change "ribbons" to
          -- ribbon --.

Column 12, line 1, before "said" insert -- each --.
Column 12, line 3, before "said" insert -- each --.
```

UNITED STATES PATENT AND TRADEMARK OFFICE
CERTIFICATE OF CORRECTION

PATENT NO.  :  5,210,374                                   Page 3 of 5
DATED       :  May 11, 1993
INVENTOR(S) :  William H. Channell It is certified that error appears in the above-identified patent and that said Letters Patent is hereby corrected as shown below:

```
Column 12, line 13, after "receiving" delete "a".

Column 13, line 1, before "separate" change "a" to
          -- the --.
Column 13, line 2, after "service" insert -- wire --.
Column 13, line 6, after "compartment" insert -- means --.
Column 13, line 60, change "combination" to
          -- connection --.

Column 14, line 2, after "ribbons" insert -- are --.

Column 16, line 26, after "separate" change "form" to
          -- from --.
```

Signed and Sealed this

Twenty-ninth Day of March, 1994

Attest:

BRUCE LEHMAN

Attesting Officer        Commissioner of Patents and Trademarks

United States Patent [19]

Channell

[11] Patent Number: 5,210,374
[45] Date of Patent: May 11, 1993

[54] TERMINAL HOUSING FOR BURIED COMMUNICATION LINES

[76] Inventor: William H. Channell, 38181 Creek View Cir., Marrietta, Calif. 92362

[21] Appl. No.: 526,408

[22] Filed: May 21, 1990

[51] Int. Cl.⁵ .......................................... H02G 9/00
[52] U.S. Cl. ...................................... 174/38; 174/60; 174/77 R
[58] Field of Search ................... 174/38, 50, 51, 60, 174/77 R, 78; 361/386; 439/275, 521

[56] References Cited

U.S. PATENT DOCUMENTS

| | | |
|---|---|---|
| Re. 27,746 | 8/1973 | Hamilton ............................ 174/38 |
| 871,984 | 11/1907 | Cook .................................. 174/60 |
| 3,435,124 | 3/1969 | Channell ............................ 174/38 |
| 3,557,299 | 1/1971 | Dienes ............................... 174/38 |
| 3,728,467 | 4/1973 | Klayum et al. .................... 174/38 |
| 3,769,443 | 10/1973 | Prezchala et al ................. 174/38 |
| 3,848,074 | 11/1974 | Channell ............................ 174/38 |
| 4,097,680 | 6/1978 | Summers ........................... 174/38 |
| 4,243,834 | 1/1981 | Logioco ............................. 174/38 |
| 4,542,437 | 9/1985 | Ellis et al. .......................... 361/386 |

OTHER PUBLICATIONS

Bell System Practices, "Dedicated Plant-Buried-Control and Access Points", AT&T Co., May 3, 1967, U.S.A.

Primary Examiner—Leo P. Picard
Assistant Examiner—Hyung S. Sough
Attorney, Agent, or Firm—Christie, Parker & Hale

[57] ABSTRACT

An airtight, watertight, self-contained housing for buried communication lines, such as telephone lines comprising a main cable and service wires, includes a waterproof housing having a base, a ground stake for installing the housing in the ground, separate compartments formed in the housing below the base to separately receive main cable and service wires, a sealed inner splice chamber above the base, and a sealed outer terminal chamber above the base for enclosing the splice chamber and for containing a terminal block. Main cable passes through the base into the splice chamber which includes a support, an elastomeric seal forming a watertight seal between the main cable entering the splice chamber, and an opening to the chamber through the support. A waterproof inner cover joined to the support by a watertight seal forms the sealed splice chamber. The remaining area of the base has separate, removable screw-threaded plugs with O-ring seals to corresponding holes in the base, each for receiving a corresponding service wire. A service wire is installed by removing a sealed plug, passing the service wire through the hole for connection to the terminal block, and forming a watertight seal around the service wire with an elastomeric grommet. A waterproof outer cover is joined to the base by a watertight seal to form a sealed outer terminal chamber that encloses the terminal block and the sealed splice chamber. Another embodiment of the invention provides a terminal for service wire without use of the sealed inner splice chamber.

26 Claims, 12 Drawing Sheets